Dec. 13, 1949     C. A. GUSTAFSON     2,490,904
RIPPER
Filed July 26, 1946     2 Sheets-Sheet 1
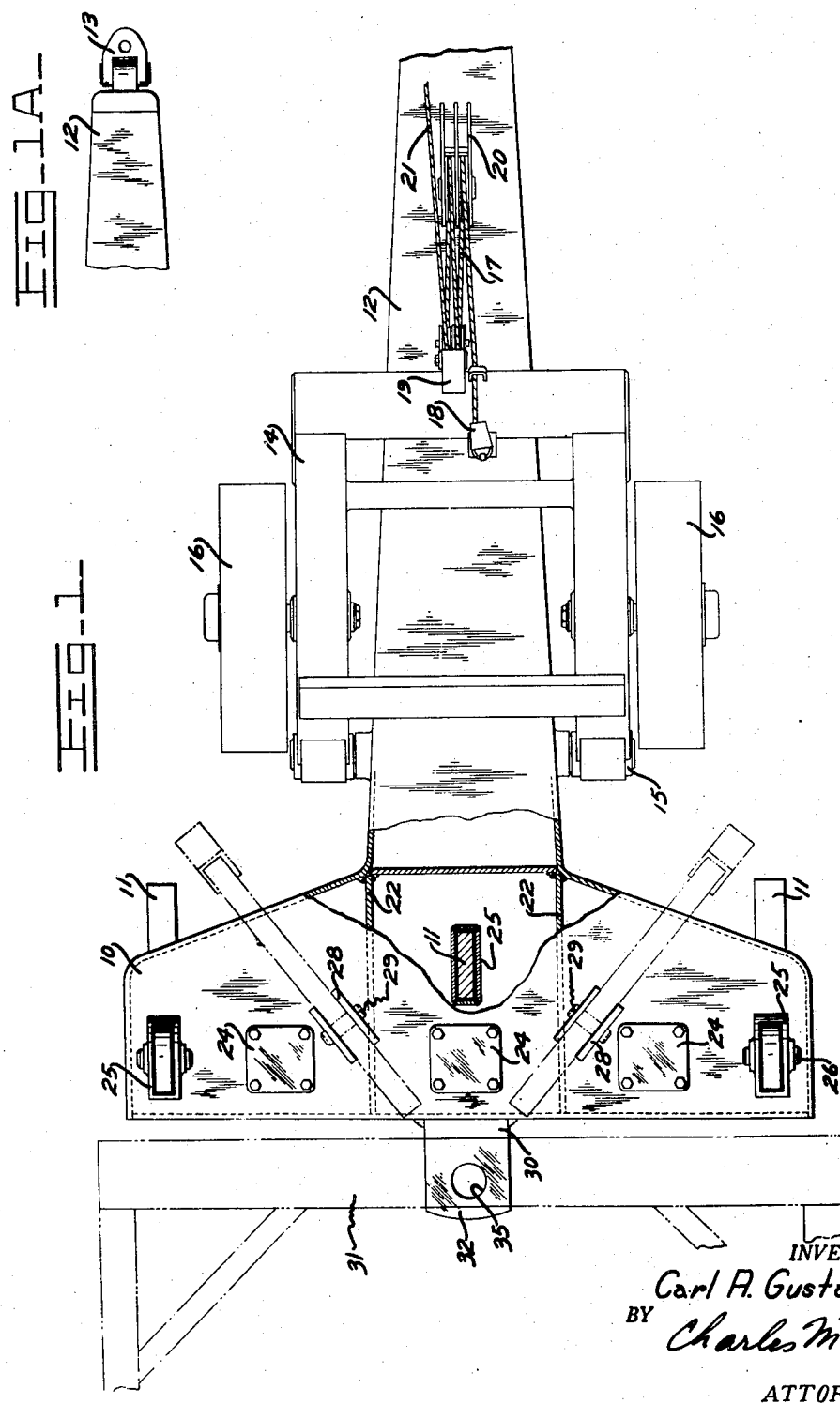
INVENTOR.
Carl A. Gustafson
BY Charles M. Fryer
ATTORNEY.

Dec. 13, 1949     C. A. GUSTAFSON     2,490,904
RIPPER
Filed July 26, 1946     2 Sheets-Sheet 2
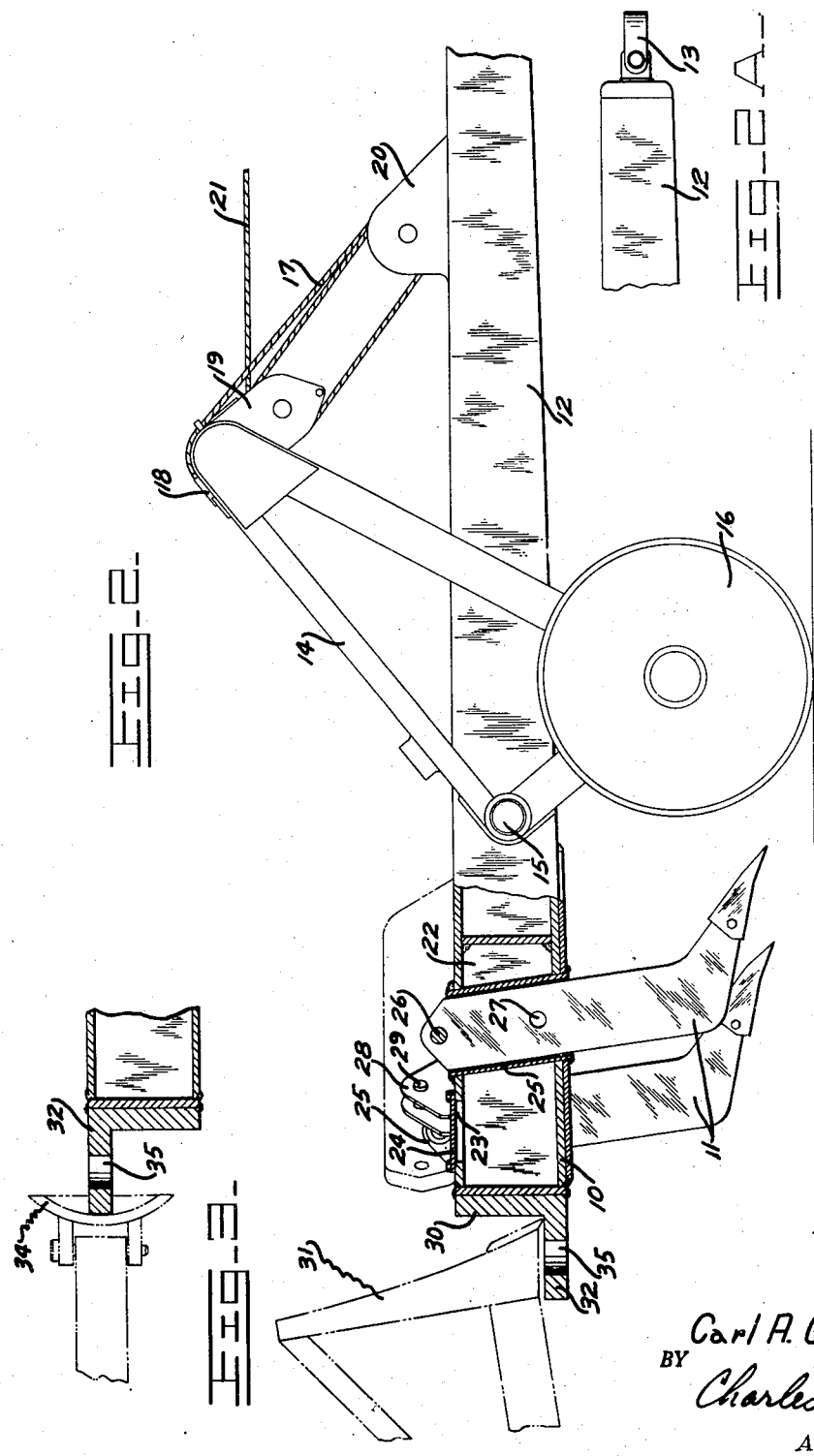
INVENTOR.
Carl A. Gustafson
BY Charles M. Fryer
ATTORNEY.

Patented Dec. 13, 1949

2,490,904

UNITED STATES PATENT OFFICE 2,490,904

RIPPER

Carl A. Gustafson, Peoria, Ill., assignor to Caterpillar Tractor Co., San Leandro, Calif., a corporation of California Application July 26, 1946, Serial No. 686,598

4 Claims. (Cl. 262—8)

This invention relates to rippers which are employed for cutting through to break or loosen the earth before it is moved by a bulldozer, scraper, or other equipment designed for earth moving purposes.

Rippers in general comprise heavy teeth adapted to be drawn through the earth for the purpose of breaking up hard formations and dislodging large rocks and other obstacles to earth moving implements. Due to the heavy service to which rippers are subjected, it is desirable that they be of extremely rugged and durable construction and capable of being heavily weighted when in use.

It is one of the objects of this invention, therefore, to provide a ripper of simple and durable construction to which weight may be readily added and which has novel and unusually rigid means for adjustably and removably supporting the ripper teeth. Another object of the invention is to provide a ripper having means for carrying extra teeth or teeth not in use which will add weight and maintain a low center of gravity. Still further and more specific objects and advantages of the invention are made apparent in the following specification wherein reference is made to the accompanying drawings.

In the drawings:

Fig. 1 is a plan view with parts in section of a ripper embodying the present invention and with the forward portion of the draft tongue broken away;

Fig. 1A is a plan view of that portion of the draft tongue not shown in Fig. 1;

Fig. 2 is a view in side elevation of the same ripper with parts shown in section and with the forward portion of the draft tongue broken away; and Fig. 2A is a side elevation of that portion of the draft tongue not shown in Fig. 2;

Fig. 3 is a fragmentary view in section illustrating a modified form of a part of the ripper shown in Fig. 2.

The main body portion of the ripper is shown at 10 in the drawings as carrying ripper teeth 11, three of which are illustrated though more or less teeth may be employed if desired. A draft tongue 12 extends forwardly of the body portion 10 and is provided at its forward end with a fitting 13 by means of which it may be connected with any suitable draft implement such as a tractor.

A wheel truck 14 is pivotally connected as at 15 with the ripper preferably at opposite sides of the draft tongue just forward of the main body portion and carries a pair of wheels 16 which engage the ground. As the wheels are disposed forwardly of the pivotal connection 15 of the truck they tend to swing upwardly about this connection to lower the body of the ripper with relation to the ground. The distance of the body from the ground and therefore the depth to which the teeth 11 will penetrate the ground is determined by a cable 17 which normally prevents the wheels 16 from swinging upwardly about the pivotal connection 15. One end of the cable 17 is anchored as at 18 to the wheel truck and the cable is passed over complementary sheave blocks 19 and 20, one carried by the wheel truck and the other carried by the tongue portion 12. The free end of the cable shown at 21 leads forwardly to the draft implement where it may be controlled by a power winch or any other suitable means capable of taking it in or paying it out for the purpose of controlling the position of the wheel truck and therefore regulating the elevation of the ripper with relation to the ground.

The body 10 of the ripper is preferably of hollow construction made of steel plates welded together to provide an interior capable of containing water, sand, or other substances which may be utilized for adding to the weight of the ripper. Two or more partitions such as shown at 22 in Fig. 1 are preferably provided within the hollow body portion so that if liquid is used as a ballast it will be substantially equally distributed throughout the width of the body even though the ripper may be tilted to one side. Access openings 23 (Fig. 2) normally closed by cover plates 24 are provided, one for each of the separate compartments which are formed by the partitions 22, for the admission of whatever material is used as ballast. The ballast may be removed when desired by first removing the covers 24 and then inverting the body of the ripper.

The ripper teeth 11 must be substantially supported and therefore preferably extend through the main body portion of the ripper. In order to provide a rigid mounting for each of the teeth and at the same time prevent leakage of ballast from the ballast compartments which they penetrate, a socket 25 of hollow rectangular cross section extends through the ripper body for the reception of each tooth and is welded to both the top and bottom plates of the body member, as illustrated in Fig. 2. The upper edges of the socket members 25 may be extended above the top plate of the body member and perforated for the reception of pins 26 which extend through suitable perforations in the tooth to retain it against downward movement through the socket. Each of the teeth is provided with an additional perforation 27 intermediate its ends and the ripper body carries pairs of spaced brackets 28 on its upper surface so that when a ripper tooth is not in use it may be placed between these brackets and secured by a pin 29 which passes through suitable perforations in the brackets 28. As the ripper is frequently used with a single tooth, the extra teeth may be carried in the positions indicated in broken lines where their weight is added to that of the ripper body and ballast and where, due to the position in which they are carried, the center of gravity of the entire ripper is maintained at a relatively low point.

It is often necessary to augment the power of the draft implement to advance the ripper and it is common practice to do so by approaching it from the rear and pushing with a tractor or the like provided at its forward end with a pusher cup or a bulldozer. A plate for receiving the thrust of such pushing implement is therefore secured to the central portion of the rear end of the body 10 and as best shown in Fig. 2 is of angular form having a vertical portion 30 to receive the thrust of a bulldozer blade indicated in broken lines at 31 and having a horizontal portion 32 which may be employed to support the weight of the bulldozer blade and in that way add further to the weight of the ripper which tends to maintain its teeth at the desired depth in the ground. The position of the angular plate may be reversed from that shown in Fig. 2 so that its horizontal leg 32 occupies a higher position as illustrated in Fig. 3. Thus, when a pusher cup, shown in broken lines at 34, is employed, the lower edge of the cup will be above the bottom of the body of the ripper and out of danger of scraping on the ground. The leg 32 of the angular member may be perforated as indicated at 35 for the reception of a hook in the event that it is necessary to pull the ripper rearwardly away from an obstruction against which it has become stalled.

The mounting of the ripper teeth herein disclosed has the advantage that the teeth are rigidly braced and although they pass through the ballast compartments the manner of bracing them prevents leakage of ballast adjacent the areas which they penetrate.

I claim:

1. A ripper comprising a body member of hollow form to receive ballast in liquid or granular form, teeth extending through said body member, and hollow sockets extending through the body member for the reception of said teeth and sealed at their point of contact with the body member to prevent the escape of ballast.

2. A ripper comprising a body member of hollow form to receive ballast in liquid or granular form, teeth extending through said body member, and hollow sockets extending through the body member for the reception of said teeth and sealed at their point of contact with the body member to prevent the escape of ballast, and a bracket at the rear of the body member to receive the thrust and support weight of an implement employed to push the ripper.

3. A ripper comprising a body member of hollow form having top and bottom plates, sockets of rectangular cross section extending through both said plates and secured thereto in a manner to prevent escape of ballast carried within the body member.

4. A ripper comprising a body member of hollow form having top and bottom plates, sockets of rectangular cross section extending through both said plates and secured thereto in a manner to prevent escape of ballast, and brackets on the top plate for carrying the teeth when they are removed from said sockets.

CARL A. GUSTAFSON.

REFERENCES CITED

The following references are of record in the file of this patent:

UNITED STATES PATENTS

| Number | Name | Date |
| --- | --- | --- |
| 1,189,168 | Parsons | June 27, 1916 |
| 1,298,374 | Moyer | Mar. 25, 1919 |
| 1,931,783 | Wickes | Oct. 24, 1933 |
| 2,128,602 | Davenport | Aug. 30, 1938 |